(12) United States Patent
Campbell

(10) Patent No.: US 10,953,944 B1
(45) Date of Patent: Mar. 23, 2021

(54) SADDLE BAG MOUNTING BRACKET WITH A LATCH

(71) Applicant: Garry L. Campbell, Greenville, WI (US)

(72) Inventor: Garry L. Campbell, Greenville, WI (US)

(*) Notice: Subject to any disclaimer, the term of this patent is extended or adjusted under 35 U.S.C. 154(b) by 0 days.

(21) Appl. No.: 16/708,678

(22) Filed: Dec. 10, 2019

(51) Int. Cl.
  *B62J 9/00* (2020.01)
  *F16B 2/18* (2006.01)

(52) U.S. Cl.
  CPC .............. *B62J 9/00* (2013.01); *F16B 2/185* (2013.01)

(58) Field of Classification Search
  CPC ......... B62J 9/00; B62J 9/20; B62J 9/23; B62J 9/24; B62J 9/26; B62J 9/27
  See application file for complete search history.

(56) References Cited

U.S. PATENT DOCUMENTS

| | | | |
|---|---|---|---|
| 6,293,450 B1* | 9/2001 | Aron | B62J 9/20 224/430 |
| 6,830,169 B1 | 12/2004 | Campbell | |
| 7,621,362 B2* | 11/2009 | Ogawa | B62J 1/08 180/219 |
| 8,172,188 B2* | 5/2012 | Dubinskiy | B62J 9/20 248/214 |
| 8,944,303 B1* | 2/2015 | Campbell | B62J 9/26 224/430 |
| 10,144,469 B2* | 12/2018 | Marui | B62J 1/08 |

FOREIGN PATENT DOCUMENTS

| | | | | |
|---|---|---|---|---|
| JP | 11115849 A | * | 4/1999 | ............. B62J 11/00 |
| JP | 11301542 A | * | 11/1999 | ............... B62J 1/08 |

* cited by examiner

*Primary Examiner* — Scott T McNurlen
(74) *Attorney, Agent, or Firm* — Donald J. Ersler

(57) ABSTRACT

A saddle bag mounting bracket preferably includes a base plate, clamp lever, a latch lever, a pressure adjustment device, a first pin clamp and a second pin clamp. The clamp lever is slidably engaged with the base plate. The latch lever is pivotally retained on one end of the clamp lever and biased with an extension spring. The latch lever includes a finger release, such that clamp lever may be unlatched from a latch tab extending from the base plate. One end of the pressure adjustment device is adjustably connected to the second pin clamp and an opposing end is pivotally connected to the clamp lever. The first and second pin clamps lock the base plate into first and second pins extending from a motorcycle or the like, when the clamp lever is latched. A key lock is preferably used to prevent the clamp lever from being unlatched.

17 Claims, 6 Drawing Sheets

SADDLE BAG MOUNTING BRACKET WITH A LATCH

BACKGROUND OF THE INVENTION

1. Field of the Invention

The present invention relates generally to saddle bags for wheeled transport devices and more specifically to a saddle bag mounting bracket with a latch, which enables a clamp lever to be latched to a base plate of the saddle bag mounting bracket to ensure that the saddle bag is retained on the saddle bag mounting bracket.

2. Discussion of the Prior Art

It appears that the prior art does not disclose a saddle bag mounting bracket with a latch, which enables a saddle bag to be securely latched and clamped to mounting pins of a wheeled transport device. U.S. Pat. No. 6,293,450 to Aron discloses a quick release mechanism for motorcycle saddle-bag. U.S. Pat. No. 6,830,169 to Campbell discloses a quick release saddlebag mounting system. U.S. Pat. No. 8,944,303 to Campbell discloses a clamp-on saddle bag mounting system, which is hereby incorporated by reference in its entirety. However, Campbell fails to provide a latch, which ensures that the saddle bag is positively secured to mounting pins on the motorcycle.

Accordingly, there is a clearly felt need in the art for a saddle bag mounting bracket with a latch, which enables a clamp lever to be latched to a base plate of the saddle bag mounting bracket to ensure that the saddle bag is retained on the saddle bag mounting bracket.

SUMMARY OF THE INVENTION

The present invention provides a saddle bag mounting bracket with a latch, which enables a saddle bag to be latched to mounting pins on a wheeled transportation device, such as a motorcycle. The saddle bag mounting bracket (bag mounting bracket) preferably includes a base plate, clamp lever, a latch lever, a pressure adjustment device, a first pin clamp and at least one second pin clamp. The base plate includes a clamp lever slot, a first pin opening, a second pin opening, a first clamp slot, a second clamp slot, a lock opening, an adjustment opening and a latch tab. The clamp lever slot is located in substantially a middle of the base plate. The first pin opening is located on a first end of the base plate and the second pin opening is located on a second end of the base plate. The first clamp slot is located below the first pin opening. The second clamp slot is located below the second pin opening. The adjustment opening is located between the second clamp slot and the clamp lever slot. The lock opening is located above the first clamp slot. The latch tab is located at a second end of the base plate.

The clamp lever preferably includes a base portion, a latch portion, a pin clamp extension and a spring cutout. The latch portion extends from one end of the base portion and the pin clamp extension extends from an opposing end of the base portion. The latch portion includes a latch opening for receiving a release tab of a latch lever. The opposing end of the base portion is slidably retained in the clamp lever slot. The spring cutout is located adjacent the latch opening. The latch lever includes a base portion, a latch projection and finger release. The finger release extends from a side of the base portion and the latch projection extends from a bottom of the base potion. The base portion is pivotally retained on the clamp lever, adjacent the latch opening. The finger release extends outward from the base portion and into latch opening. An extension spring is retained in the spring cutout. One end of the extension spring is engaged with spring retention hole at the end of the spring cutout. The latch projection engages the latch tab.

The pressure adjustment device preferably includes an adjustment base, an eye bolt and an adjustment nut. The adjustment base includes a nut tab and a nut opening to axially retain the adjustment nut. The eye bolt extends from a first end of the adjustment base. A second end of the adjustment base is pivotally engaged with the at least one second pin clamp. The second pin clamp includes a second curved slot, a second adjustment hole and a second base hole. The second adjustment hole is pivotally engaged with a second end of the adjustment base. The second base hole is pivotally engaged with the base plate. An eye of the eye bolt is pivotally engaged with the base portion of the clamp lever. The adjustment nut is threaded on to the eye bolt. The adjustment nut is rotated on the eyebolt to provide pressure during closing. The adjustment nut is supported by the nut tab. The first pin clamp includes a first link member and at least one first pin member. Each first pin member includes a first curved pin slot, a first base hole and a first link hole. The first base hole is pivotally engaged with the base plate. The first link member is attached to the pin clamp extension of the clamp lever. The first link hole is pivotally engaged with the pin clamp extension and the first link member.

The base plate also includes a first leg mounting portion and a second leg mounting portion. The first leg mounting portion extends from a first end and a bottom of the base plate. The second leg mounting portion extends form a second and the bottom of the base plate. A top of a first bag leg is attached to the first leg mounting portion. A top of a second bag leg is attached to the second leg mounting portion. A support plate may be attached to a bottom of the first and second bag legs.

Accordingly, it is an object of the present invention to provide a saddle bag mounting bracket with a latch, which enables a clamp lever to be latched to a base plate of the saddle bag mounting bracket to ensure that the saddle bag is retained on the saddle bag mounting bracket.

These and additional objects, advantages, features and benefits of the present invention will become apparent from the following specification.

DETAILED DESCRIPTION OF THE PREFERRED EMBODIMENTS

Figure 1:
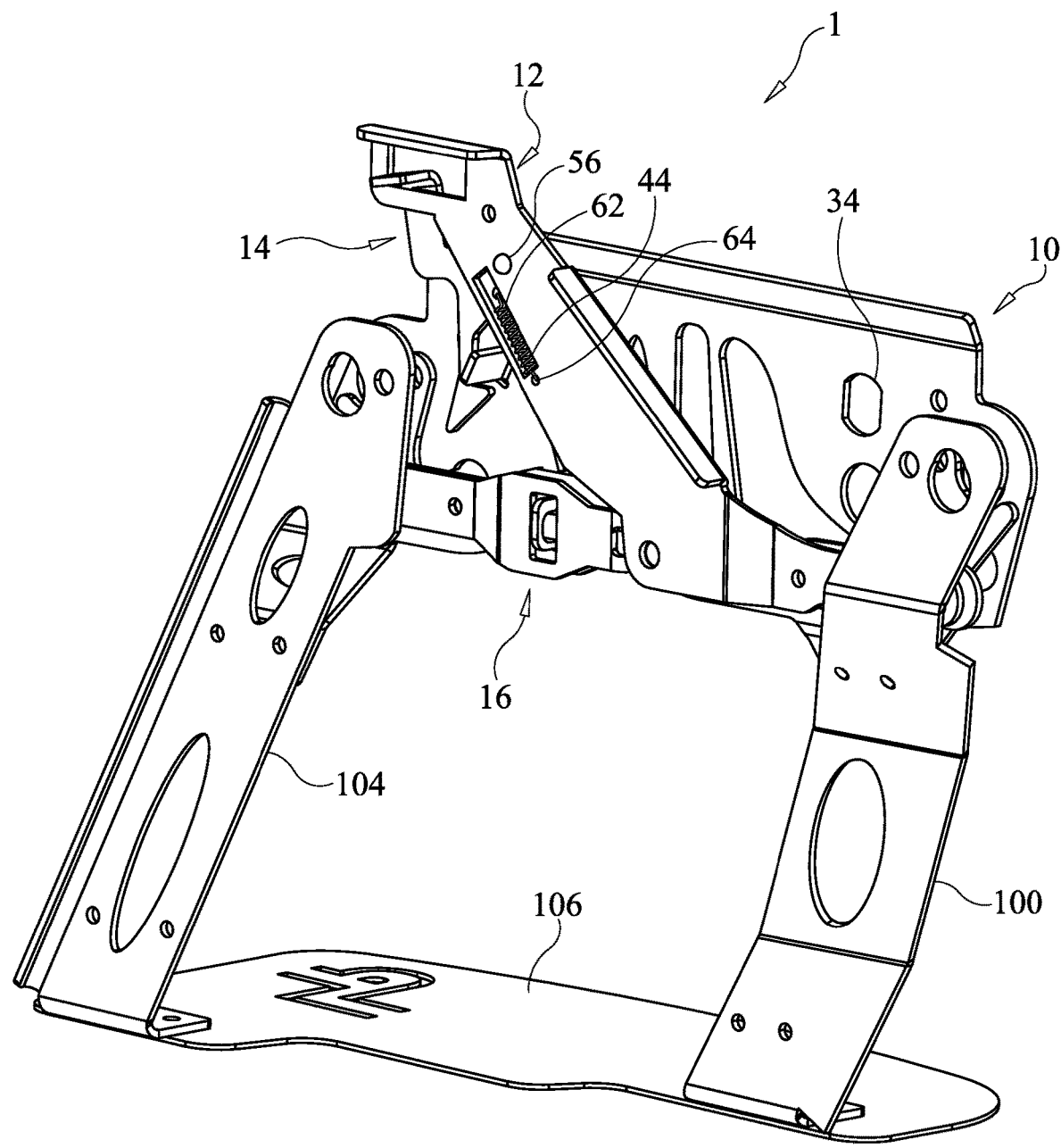
FIG. 1 is a rear perspective view of a bag mounting bracket in a latched position in accordance with the present invention.
Figure 2:
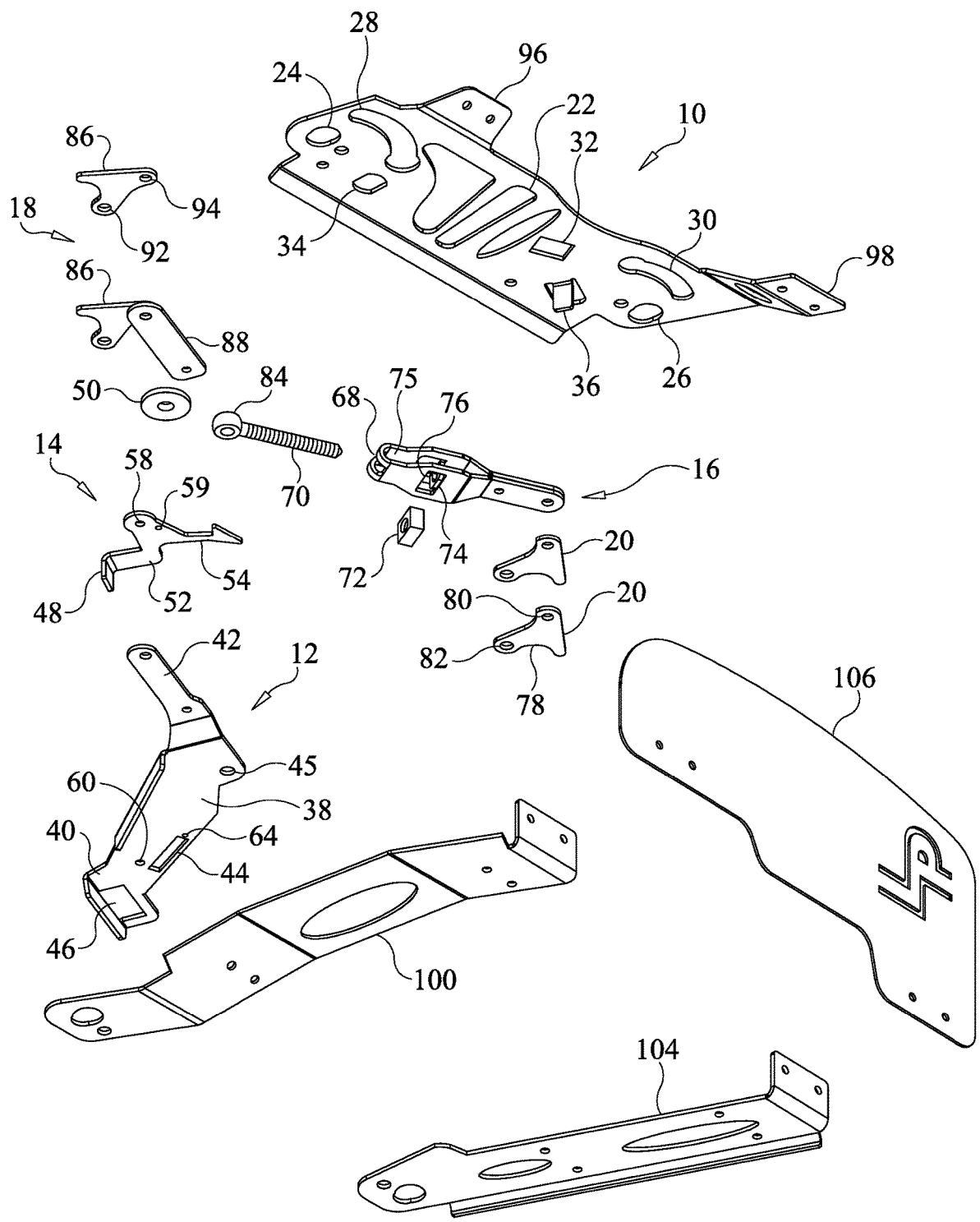
FIG. 2 is an exploded perspective view of a bag mounting bracket in accordance with the present invention.

With reference now to the drawings, and particularly to FIG. 1, there is shown a rear perspective view of a bag mounting bracket 1. With reference to FIG. 2, the bag mounting bracket 1 preferably includes a base plate 10, clamp lever 12, a latch lever 14, a pressure adjustment device 16, a first pin clamp 18 and at least one second pin clamp 20. The base plate 10 includes a clamp lever slot 22, a first pin opening 24, a second pin opening 26, a first clamp slot 28, a second clamp slot 30, an adjustment opening 32, a lock opening 34 and a latch tab 36. The clamp lever slot 22 is located in substantially a middle of the base plate 10. The first pin opening 24 is located on a first end of the base plate 10 and the second pin opening 26 is located on a second end of the base plate 10. The first clamp slot 28 is located below the first pin opening 24. The second clamp slot 30 is located below the second pin opening 26. The adjustment opening 32 is located between the second clamp slot 30 and the clamp lever slot 22. The lock opening 34 is located above the first clamp slot 30. The latch tab 36 is located at a second end of the base plate 10.

Figure 5:
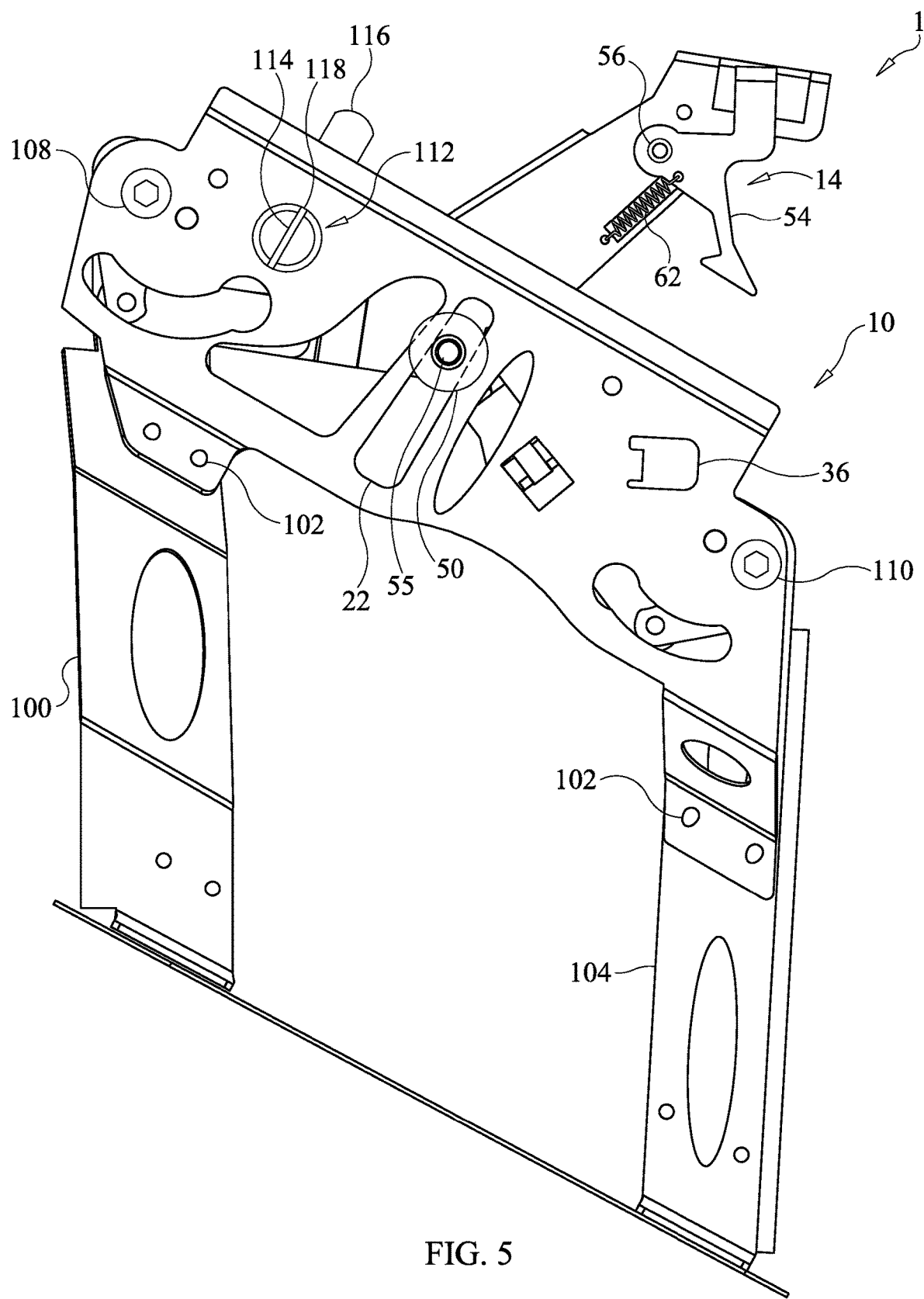
FIG. 5 is a front view of a bag mounting bracket in an unlatched position in accordance with the present invention.

The clamp lever 12 preferably includes a base portion 38, a latch portion 40, a pin clamp extension 42 and a spring cutout 44. The latch portion 40 extends from one end of the base portion 38 and the pin clamp extension 42 extends from an opposing end of the base portion 38. A fastener hole 45 formed through the opposing end of the base portion 38. The latch portion 40 includes a latch opening 46 for receiving a release tab 48 of the latch lever 14. With reference to FIG. 5, the opposing end of the clamp lever 12 is slidably engaged with the clamp lever slot with two washers 50 and a fastener 55 inserted through the fastener hole 45.

The spring cutout 44 is located adjacent the latch opening 46. The latch lever 14 includes a base portion 52, the release tab 48 and a latch projection 54. The release tab 48 extends from a side of the base portion 52 and the latch projection extends from a bottom of the base potion 52. With reference to FIG. 1, the base portion 52 of the latch lever 14 is pivotally retained on the clamp lever 12 with a pop rivet 56 or the like retained in a latch pivot hole 58 and a lever pivot hole 60. The release tab 48 extends outward from the base portion 52 and into latch opening 46. With reference FIG. 1, an extension spring 62 is retained in the spring slot 44. One end of the extension spring 62 is retained a spring hole 64 in the clamp lever 12 and the other end of the extension spring 62 is retained in the latch spring hole 597 in the latch lever 14. The latch projection 54 engages the latch tab 36.

The pressure adjustment device 16 preferably includes an adjustment base 68, an eye bolt 70 and an adjustment nut 72. The adjustment base 68 includes a nut tab 74 and a nut opening 76 to axially retain the adjustment nut 72. The adjustment base 68 is preferably fabricated from a strip of material, which is bent over itself to form a nut cavity 75. The eye bolt 70 extends through a first end of the adjustment base 68. A second end of the adjustment base 68 is pivotally engaged with the at least one second pin clamp 20. Each second pin clamp 20 includes a second curved slot 78, a second adjustment hole 80 and a second base hole 82. The second adjustment hole 80 is pivotally engaged with a second end of the adjustment base 68. The first base hole 82 of the at least one second pin clamp 20 is pivotally engaged with the base plate 10. With reference to FIG. 5, an eye 84 of the eye bolt 70 is pivotally engaged with the fastener 55 retained in the fastener hole 45 in the clamp lever 12. The adjustment nut 72 is threaded on to the eye bolt 70. The adjustment nut 72 is preferably square. The adjustment nut 72 is rotated on the eyebolt 70 to provide pressure during closing of the clamp lever 12. The adjustment nut 72 is supported by the nut tab 74. The adjustment nut 72 is in contact with the base plate 10 and cannot be adjusted when the clamp lever 12 is latched to the base plate 10.

The first pin clamp 18 includes at least one first pin member 86 and a first link member 88. The first pin member 86 includes a first curved pin slot 90, a first base hole 92 and a first link hole 94. The first base hole 92 is pivotally engaged with the base plate 10. The first link member 88 is attached to the pin clamp extension 42 of the clamp lever 10. The first link hole 94 is pivotally engaged with the pin clamp extension 42 and the first link member 88. The base plate 10 also includes a first leg mounting portion 96 and a second leg mounting portion 98. The first leg mounting portion 96 extends from a first end and a bottom of the base plate 10. The second leg mounting portion 98 extends form a second end and the bottom of the base plate 10.

Figure 3:
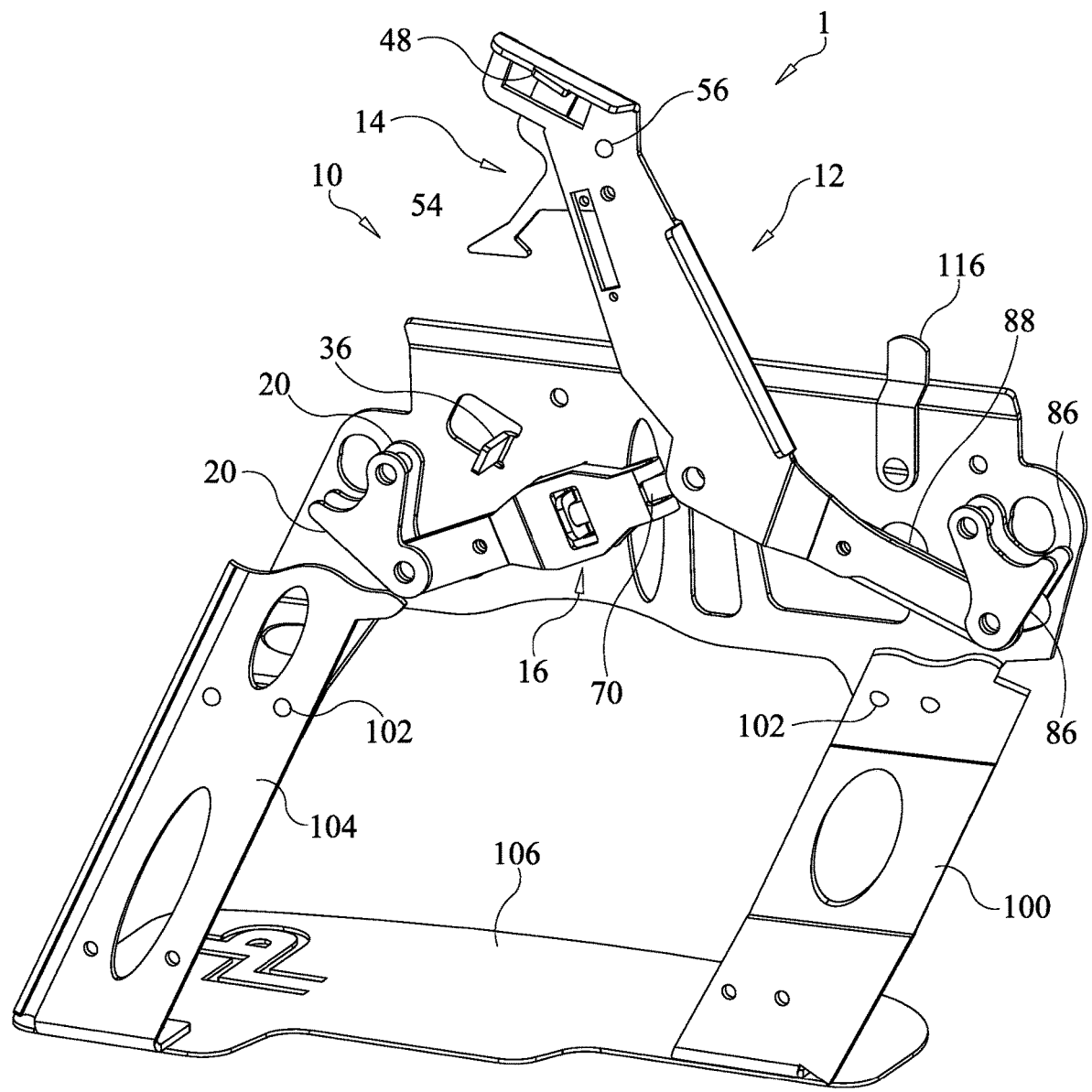
FIG. 3 is a rear perspective view of a bag mounting system in an unlatched position with top portions of the first and second legs cutaway to illustrate first and second pin clamps in accordance with the present invention.
Figure 4:
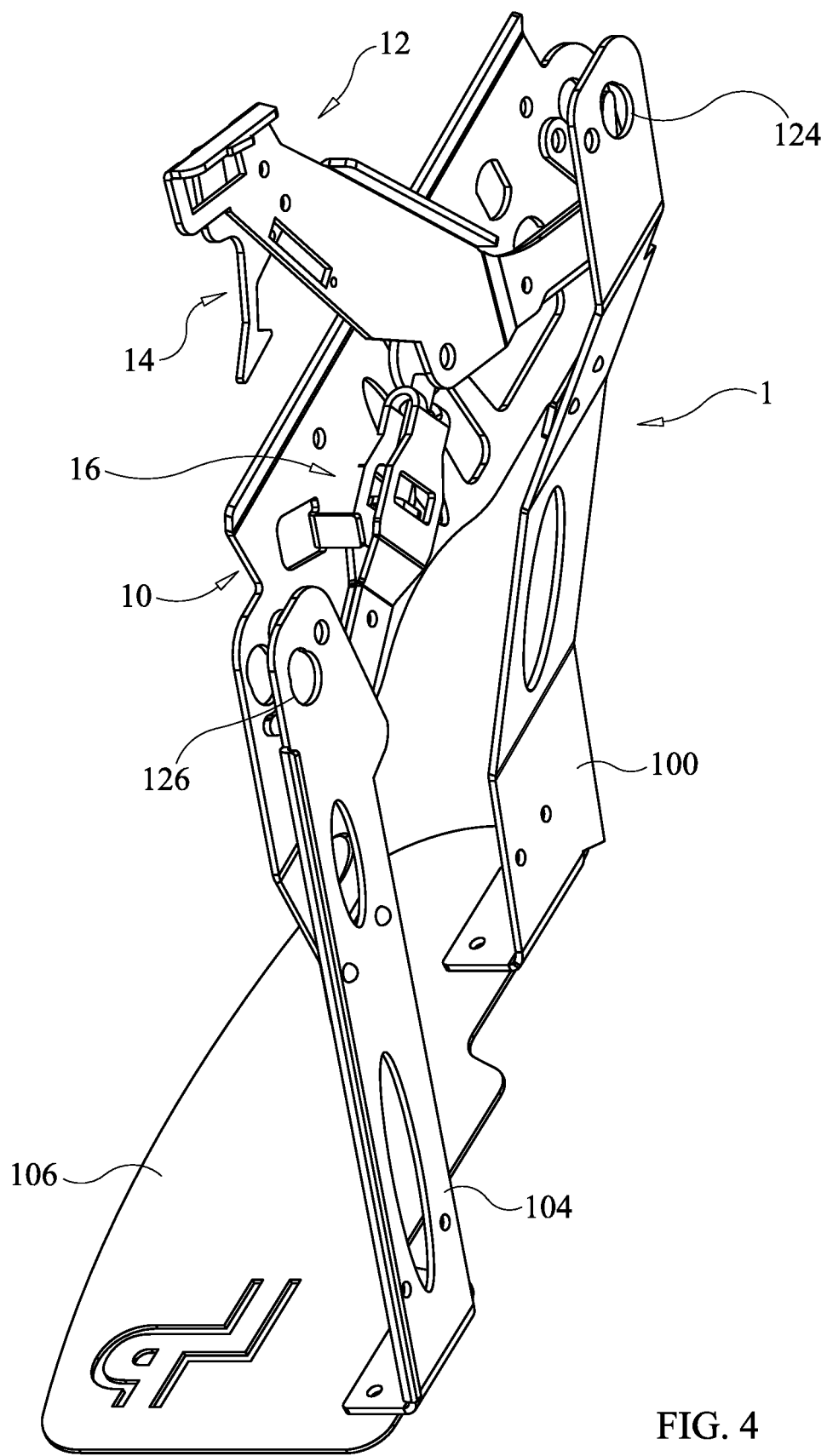
FIG. 4 is a top perspective view of a bag mounting bracket in an unlatched position in accordance with the present invention.

A top of a first bag leg 100 is attached to the first leg mounting portion 96 with rivets 102 or the like. A top of a second bag leg 104 is attached to the second leg mounting portion 98 with rivets 102 or the like. A support plate 106 may be attached to a bottom of the first and second bag legs. A first pin 108 and a second pin 110 extend from a wheeled transport device, such as a motorcycle. The first and second pins 104, 106 include a slot that are sized to receive a thickness of the base plate 10. The first and second pin clamps 18, 20 force the first and second pins 104, 106 into the base plate 10, when the clamp lever 12 is closed and latched. A lock 112 is retained in the lock opening 34. With reference to FIG. 3, the lock 112 includes a key slot 114 and a lock lever 116. A key 118 is inserted into the key slot 114 and is used to turn the lock lever 116, such that the clamp lever 10, may not be moved when in a latched or closed orientation. The key is then removed from the lock slot 114, so the clamp lever can be moved from the latched or closed orientation. The bag mounting bracket 1 includes left and right hand embodiments. The right hand embodiment is illustrated in FIGS. 1-5.

Figure 7:
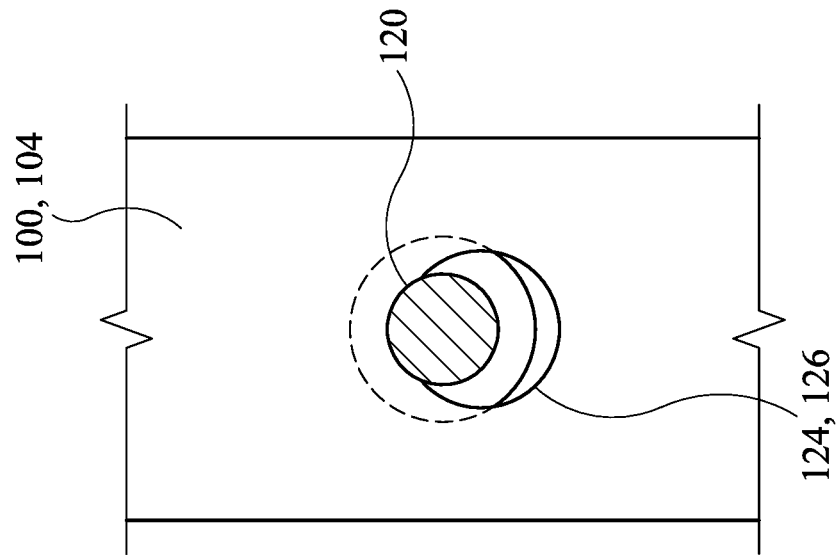
FIG. 7 is a cross sectional view cut through FIG. 6 of a first or second pin revealing a location groove formed therein of a bag mounting bracket in accordance with the present invention.
Figure 6:
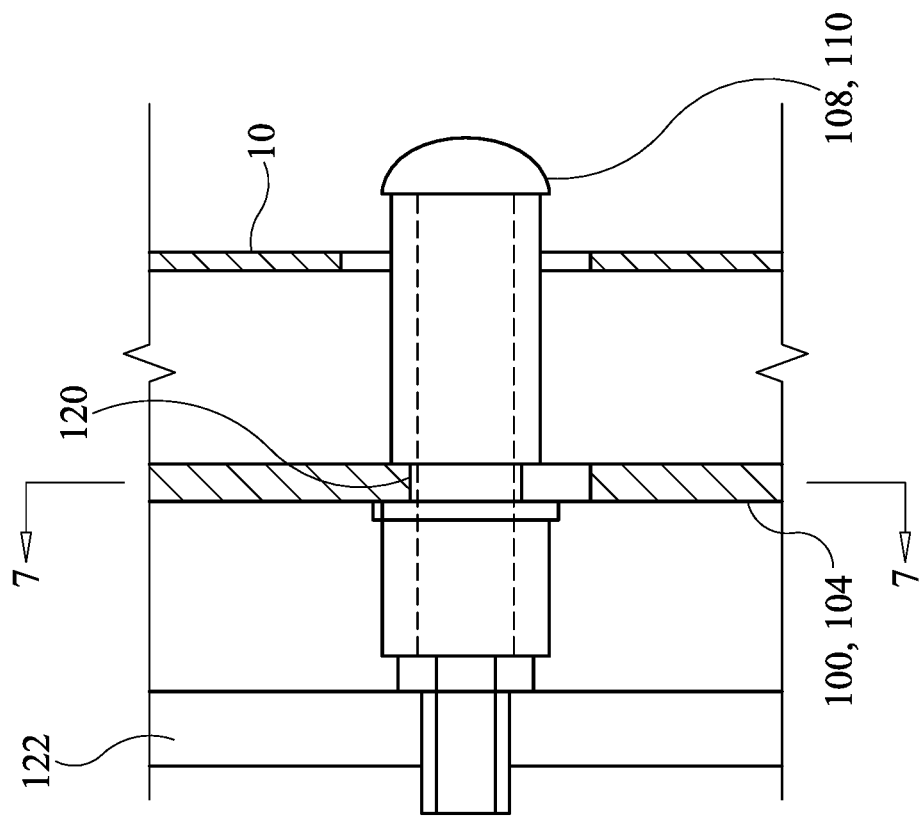
FIG. 6 is a partially cross sectional of a first or second pin attached to a frame of a wheeled transport device, and a groove of the first or second pin engaged with a first or second bag leg and supporting a base plate of a bag mounting bracket in accordance with the present invention.

With reference to FIGS. 6-7, the first and second pins 108, 110 include a location groove 120. Ends of the first and second pins 108, 110 are threaded into a frame 122 of a wheeled transport device. The first pin 108 is inserted through a first oblong pin hole 124 in the first bag leg 100 and the second pin 110 is inserted through a second oblong pin hole 124 in the second bag leg 104. The location groove 120 is sized to receive a thickness of the first or second bag legs 100, 104. The thickness of the first and second bag legs 100, 104 must be fully inserted into the location grooves 120 in the first and second pins 108, 110 for the clamp lever 12 to be closed. The location groove 120 ensures that the bag mounting bracket 1 is properly mounted to the first and second pins 108, 110. Otherwise, the bag mounting bracket 1 may come off the first and second pins 108, 110 with a bag attached to it. Demounting of the bag mounting bracket 1 could cause a serious accident in a roadway due to a serving vehicle.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A saddle bag mounting bracket with a latch for securement to a wheeled vehicle, comprising:
   a base plate having a first pin opening and a second pin opening, said first pin opening is formed in a first end of said base plate, said second pin opening is formed in a second end of said base plate; and
   a clamp lever is slidably engaged with said base plate;
   a first pin clamp is pivotally engaged with one end of said clamp lever;
   a second pin clamp;
   an adjustment device having one end pivotally engaged with said clamp lever, a length of said adjustment device is adjustable relative to said clamp lever, said second pin clamp is pivotally engaged with an opposing end of said adjustment device;
   a latch lever includes a latch projection on one end and a release tab on an opposing end, said latch lever is pivotally engaged with said clamp lever, said latch projection engages said base plate to ensure said clamp lever is in a secured position, wherein pulling said release tab disengages said latch projection from said base plate, said clamp lever is used to engage a first pin retained in said first pin clamp and a second pin retained in said second pin clamp to secure said saddle bag mounting bracket to the first and second pins of a wheeled transport device, said saddle bag mounting bracket remains secured to the wheeled transport device when said latch lever is released; and
   said release tab extends through an opening in an opposing end of said clamp lever.

2. The saddle bag mounting bracket with a latch of claim 1, further comprising:
   a lock is retained in said base plate, said lock prevents said clamp lever from being released from a closed position.

3. The saddle bag mounting bracket with a latch of claim 1 wherein:
   said adjustment device includes an adjustment base, an eye bolt and an adjustment nut, a length of said adjustment device is changed by rotating said adjustment nut on said eye bolt.

4. The saddle bag mounting bracket with a latch of claim 1, further comprising:
   a first bag leg is attached to a first end and a bottom of said base plate, a second bag leg is attached to a second end and a bottom of said base plate.

5. The saddle bag mounting bracket with a latch of claim 4, further comprising:
   a first pin includes a first location groove, a second pin includes a second location groove, a first pin hole is formed through said first bag leg to receive said first pin, a second pin hole is formed through said second bag leg to receive said second pin, said first and second location grooves are sized to receive a thickness of said first and second bag legs.

6. The saddle bag mounting bracket with a latch of claim 4, further comprising:
   a support plate is attached to a bottom of said first and second bag legs.

7. A saddle bag mounting bracket with a latch for securement to a wheeled vehicle, comprising:
   a base plate having a first pin opening and a second pin opening, said first pin opening is formed in a first end of said base plate, said second pin opening is formed in a second end of said base plate;
   a clamp lever is slidably engaged with said base plate;
   at least one first pin clamp is pivotally engaged with one end of said clamp lever;
   at least one second pin clamp;
   a latch lever includes a latch projection on one end and a release tab on an opposing end, said latch lever is pivotally engaged with said clamp lever, said latch projection engages said base plate to ensure said clamp lever is in a secured position, wherein pulling said release tab disengages said latch projection from said base plate;
   an adjustment device having one end pivotally engaged with said clamp lever, a length of said adjustment device is adjustable relative to said clamp lever, said at least one second pin clamp is pivotally engaged with an opposing end of said adjustment device, wherein said at least one first pin clamp engages a first pin of a wheeled transport device, said at least one second pin clamp engages a second pin of the wheeled transport device to secure said saddle bag mounting bracket to the wheeled transport device, said saddle bag mounting bracket remains secured to the wheeled transport device when said latch lever is released; and
   said release tab extends through an opening in an opposing end of said clamp lever.

8. The saddle bag mounting bracket with a latch of claim 7, further comprising:
   a lock is retained in said base plate, said lock prevents said clamp lever from being released from a closed position.

9. The saddle bag mounting bracket with a latch of claim 7 wherein:
   said adjustment device includes an adjustment base, an eye bolt and an adjustment nut, a length of said adjustment device is changed by rotating said adjustment nut on said eye bolt.

10. The saddle bag mounting bracket with a latch of claim 7, further comprising:
    a first bag leg is attached to a first end and a bottom of said base plate, a second bag leg is attached to a second end and a bottom of said base plate.

11. The saddle bag mounting bracket with a latch of claim 10, further comprising:
    a first pin includes a first location groove, a second pin includes a second location groove, a first pin hole is formed through said first bag leg to receive said first pin, a second pin hole is formed through said second bag leg to receive said second pin, said first and second location grooves are sized to receive a thickness of said first and second bag legs.

12. The saddle bag mounting bracket with a latch of claim 10, further comprising:
    a support plate is attached to a bottom of said first and second bag legs.

13. A saddle bag mounting bracket with a latch for securement to a wheeled vehicle, comprising:
    a base plate having a first pin opening and a second pin opening, said first pin opening is formed in a first end of said base plate, said second pin opening is formed in a second end of said base plate, a latch tab extends from said base plate; and
    a clamp lever is slidably engaged with said base plate;
    at least one first pin clamp is pivotally engaged with one end of said clamp lever;
    at least one second pin clamp;

a latch lever includes a latch projection on one end and a release tab on an opposing end, said latch lever is pivotally engaged with said clamp lever, said latch projection engages said base plate to ensure said clamp lever is in a secured position, wherein pulling said release tab disengages said latch projection from said base plate;

an adjustment device having one end pivotally engaged with said clamp lever, a length of said adjustment device is adjustable relative to said clamp lever, said at least one second pin clamp is pivotally engaged with an opposing end of said adjustment device, wherein said at least one first pin clamp engages a first pin of a wheeled transport device, said at least one second pin clamp engages a second pin of the wheeled transport device to secure said saddle bag mounting bracket to the wheeled transport device, said saddle bag mounting bracket remains secured to the wheeled transport device when said latch lever is released; and said release tab extends through an opening in an opposing end of said clamp lever.

14. The saddle bag mounting bracket with a latch of claim 13, further comprising:

a lock is retained in said base plate, said lock prevents said clamp lever from being released from a closed position.

15. The saddle bag mounting bracket with a latch of claim 13 wherein:

said adjustment device includes an adjustment base, an eye bolt and an adjustment nut, a length of said adjustment device is changed by rotating said adjustment nut on said eye bolt.

16. The saddle bag mounting bracket with a latch of claim 13, further comprising:

a first bag leg is attached to a first end and a bottom of said base plate, a second bag leg is attached to a second end and a bottom of said base plate.

17. The saddle bag mounting bracket with a latch of claim 16, further comprising:

a first pin includes a first location groove, a second pin includes a second location groove, a first pin hole is formed through said first bag leg to receive said first pin, a second pin hole is formed through said second bag leg to receive said second pin, said first and second location grooves are sized to receive a thickness of said first and second bag legs.

\* \* \* \* \*